May 19, 1953 — S. L. LEACH — 2,638,782
TRUE AIR SPEED INDICATOR
Filed June 18, 1947
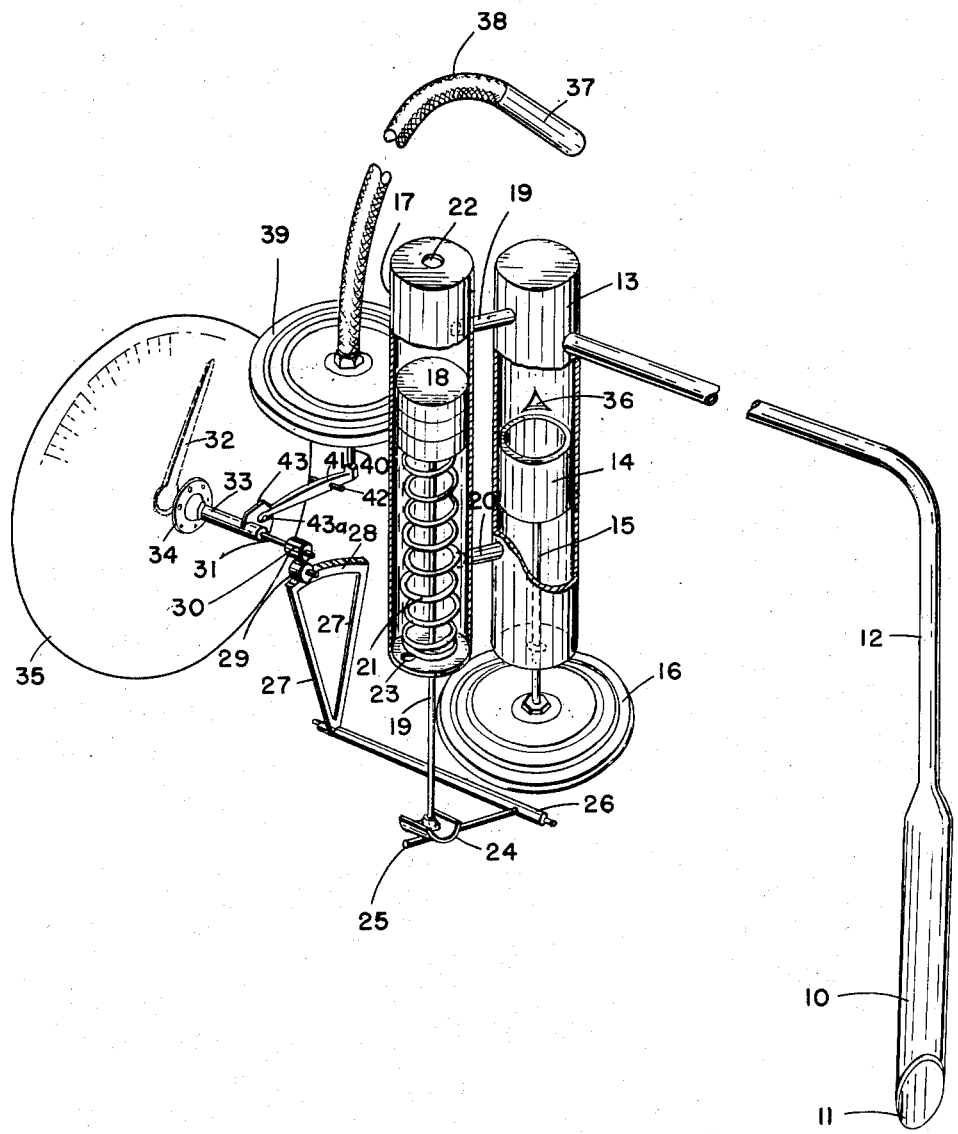
Inventor
SAM L. LEACH
By F. J. Schmitt
Attorney Patented May 19, 1953

2,638,782

UNITED STATES PATENT OFFICE 2,638,782

TRUE AIR SPEED INDICATOR

Sam L. Leach, Louisville, Ky.

Application June 18, 1947, Serial No. 755,275

10 Claims. (Cl. 73—182)

(Granted under Title 35, U. S. Code (1952), sec. 266)

The present invention relates to new and useful improvements in pressure responsive instruments, and more particularly to improvements in such instruments which are particularly adapted for use as measuring instruments in aircraft.

In general, the invention is concerned with the provision of a measuring instrument which includes a pressure responsive operating mechanism sensitive to and actuated by induced differential pressures, for operating an indicator according to such pressure differentials. More specifically, the invention contemplates the provision of such an instrument for measuring true air speed of an aircraft. Heretofore, relative air speeds have been measured by suitably mounting on the aircraft a conventional Pitot-static tube or a Pitot-Venturi tube. With such constructions, the pressure differential is measured between the dynamic or impact pressure and the static pressure. The present invention is operated by a differential in negative pressures which results when the negative pressure induced in two separate chambers by a suction head suitably mounted, exteriorly of the airplane, is modified to a different extent in each chamber by admitting a controlled amount of air under the static pressure prevailing within the interior of the said airplane.

An object of the present invention is to provide an airplane instrument capable of measuring air speed, correcting for pressure and density variables simultaneously, and automatically to provide "True" air speed.

Another object of the invention is to provide an aircraft instrument of the above type wherein the pressure responsive mechanism includes a piston operating within a cylinder in which negative pressures are induced on opposite sides of the piston head.

A further object of the invention is to provide an instrument of the above type wherein the magnitude of the induced negative pressure is controlled by means responsive to varying air pressures at various altitudes.

A still further object of the invention is to provide an instrument of the above type which is sensitive to and corrects automatically for variations in temperature and/or density of the air to provide a reading of "True" air speed.

The invention still further aims to provide an instrument of the above type which is relatively simple in construction and accurate and reliable in operation.

The above and other objects of the invention will in part be obvious and will be hereinafter more fully pointed out.

In the accompanying drawing:

The figure is a schematic detail view showing the instrument and operating mechanism therefor without regard to any specific mounting in the airplane.

The instrument may be employed with any type of airplane but it is necessary that the suction head 10 be mounted exteriorly of the aircraft, as for instance, in the air stream below the fuselage, where the air flow is free and unobstructed. The open end of the suction head 10 is mounted to face directly rearwardly and the trailing edge 11 thereof is cut on a bias and at approximately a 33° angle to the vertical which angle was found to give accurate results. A conduit 12 extends from the suction head 10 to a closed manifold cylinder 13 which forms a part of the operating mechanism. Within the cylinder 13, there is mounted an open sleeve 14 which is suitably connected to a rod 15 which extends exteriorly through the bottom of the cylinder 13 and is connected to an aneroid or evacuated diaphragm arrangement 16 which acts as a pressure and/or altitude correction device in a manner to be hereinafter pointed out. The manifold cylinder 13 serves a cylinder 17 through upper and lower conduits 19 and 20, respectively, so that the suction or reduced pressure induced in cylinder 13 will also be induced in the cylinder 17 on opposite sides of a piston 18 operating within the said cylinder 17. The piston 18 is connected to a piston rod 19 extending through the bottom end of the cylinder 17 and is normally maintained at a predetermined neutral position by a coil spring 21 also located within the lower part of the cylinder 17. The upper end of the cylinder 17 is provided with an opening 22 therethrough and the lower end of the cylinder 17 is provided with an opening 23 therethrough. The opening 22 is larger than the opening 23 so as to effect a bleed or cancellation of a part of the induced suction pressure. Thus, a pressure differential will be created in the cylinder 17 on opposite sides of the piston 18 and the greater suction pull below the piston 18 will tend to shift the piston against the action of the spring 21 so as to effect movement of the indicator as will be hereinafter described.

The free outer end of the piston rod 19 carries a plain arcuate bearing 24 which actuates an arm 25 extending radially from a pivot shaft 26. The opposite end of the shaft 26 carries radially extending arms 27 the outer ends of which are joined by an arcuate rack 28 which is in mesh with an idler pinion 29 suitably mounted on a stub shaft. The idler pinion gear 29 is in mesh with a counter-rotating pinion gear 30 carried by an actuating shaft 31 for an indicator arm 32. The shaft 31 extends through a sleeve 33 carrying an annular plate 34 to which the indicator dial 35 is secured. Thus, the indicator arm 32 is caused to move over the face of the dial 35 independently of any corrective movement which may be imparted to the dial itself. The suction pull created at the head 10 will be induced in the cylinder 13 and also differentially, as pointed out above, on opposite sides of the piston 18 within the cylinder 17 so that downward movement of the piston and piston rod 19 will be effected. Such movement will effect counterclockwise rotation of the arm 25 and the rack 28 and through the pinion gears 29 and 30, the indicator arm 32 will travel in a clockwise direction when viewed from the front of the dial 35.

In order to maintain a substantially constant reading of the arm 32 on the face of the dial 35, under given constant flight conditions, means are provided for compensating for variations in air pressure resulting from variations in flying altitudes. To this end, the wall of the cylinder 13 is provided with an opening 36 therethrough, this opening being substantially triangular in shape with the apex disposed upwardly. This opening is positioned with respect to the permissible movement of the sleeve 14 so as to provide a valve opening adapted to be controlled by the sleeve 14 acting as a valve closure. At sea level with the aneroid 16 substantially collapsed, the sleeve 14 and opening 36 will assume the relative positions shown in the drawing. In this position, there is a constant drawing of surrounding air through the opening 36. However, as the aircraft increases its altitude, the aneroid 16 will be expanded and through the connecting rod 15 will cause the sleeve 14 to move upwardly in the cylinder 13 and this movement of the sleeve 14 will tend to progressively and increasingly close the opening 36 so that, as the air pressure decreases with increased altitude, the cutting off of the supply of air through the opening 36 will tend to maintain a constant pressure differential on opposite sides of the piston 18 in the cylinder 17 and this will tend to maintain the indicator arm 32 in a more or less constant position relative to the face of the dial 35.

A temperature correction device is also included in the instrument and this device consists of a liquid type thermometer 37 suitably mounted exteriorly of the airplane and connected through a conduit 38 with a sealed diaphragm mechanism 39. The movable wall of the diaphragm 39 carries an arm 40 which is connected to a lever 41 having pivots 42 for suitably mounting the same. The opposite end of the lever 41 engages a slot 43a in a plate 43 which is rigidly secured at the sleeve 33. Through this connection, movement of the diaphragm in response to variations in temperature will effect corresponding movement of the lever 41. Thus, clockwise movement of the lever 41 about the pivot 42 will effect counterclockwise movement of the sleeve 33, viewed from the rear, and resultant clockwise movement of the dial 35 when viewed from the front thereof, such movement being independent of the indicator arm 32. In this manner, corrections in either direction for temperature variations are effected by slight compensating movement of the dial 35 relative to the indicator arm 32.

From the foregoing description, it will be seen that the invention provides a relatively simple pressure responsive instrument which is operable to indicate true air speed of the aircraft. Compensation for variations in air pressure at various altitudes is effected, as well as corrections for variations in temperature.

While one form of the invention has been shown and described for purposes of illustration, it is to be clearly understood that various changes in the details of the construction, arrangement of parts and mode of operation may be accomplished without departing from the scope of the invention as set forth in the appended claims.

The invention described herein may be manufactured and used by or for the Government of the United States of America for governmental purposes without the payment of any royalties thereon or therefor.

I claim:

1. An air speed measuring device for aircraft comprising a visual indicator, differential pressure responsive mechanism including a cylinder having a piston therein for actuating said indicator, and means including bleed holes of different size together with a suction head located in the air stream effective to create differential negative pressures on both sides of said piston and operatively connected to said mechanism for operating said pressure responsive mechanism, said last named means including valve means operable in response to air pressure variations with altitude for controlling the differential pressures created, thereby to maintain the indicator in correct position for indicating true air speed for constant flight conditions.

2. An air speed measuring device for aircraft, as claimed in claim 1, wherein the valve means includes a pressure responsive diaphragm, a manifold cylinder having a port therein, a sleeve operating within said manifold cylinder for controlling said port, and an operative connection between the sleeve and said pressure responsive diaphragm.

3. An air speed measuring device for aircraft comprising a movable visual dial and indicator arm, a cylinder having a piston operating therein, spring biasing means for said piston, bleed holes of different sizes through the opposite ends of said cylinder, means including a suction head located in the air stream and operatively connected to the opposite ends of said cylinder on both sides of said piston for creating differential suction pressures on opposite sides of said piston, thereby to actuate the piston in accordance with the magnitude of the pressure differential, means for operatively connecting said piston to said indicator arm, and temperature responsive means operatively connected to the dial for effecting corrective movement of the dial for variations in air temperature.

4. An air speed measuring device for aircraft comprising a visual indicator, pressure responsive mechanism for actuating said indicator and including a piston and cylinder arrangement, means for operatively connecting said piston to said indicator, spring biasing means for said piston, and a suction head adapted to be located exteriorly of an aircraft and operatively connected to both ends of said cylinder for inducing negative pressures therein, said cylinder having means including bleed holes of different size operating to create differential negative pressures on opposite sides of said piston whereby to actuate the piston according to such induced pressure differentials.

5. An air speed measuring device for aircraft comprising a visual indicator, pressure responsive mechanism for actuating said indicator and including a piston and cylinder arrangement, means for operatively connecting said piston to said indicator, spring biasing means for said piston, and a suction head adapted to be located exteriorly of an aircraft and dually connected to said cylinder above and below said piston for inducing negative pressures therein, said cylinder having openings therethrough on opposite sides of the permissible movement of said piston therein of different sizes whereby to create differential negative pressures for actuating said piston.

6. An air speed measuring device for aircraft comprising a visual indicator, pressure responsive mechanism for actuating said indicator and including a piston and cylinder arrangement, means for operatively connecting said piston to said indicator, a suction head adapted to be located exteriorly of an aircraft and dually connected to said cylinder above and below said piston for inducing negative pressures therein, and spring means normally urging said piston toward a neutral position, said cylinder having relatively larger and smaller openings on opposite sides of said piston and arranged so as to create a greater suction pull on one side of the piston to operate the same against the action of said spring means.

7. In air speed measuring apparatus of the character disclosed for use aboard aircraft, in combination, a cylinder having two apertures of different sizes in the two ends thereof respectively, a piston disposed within said cylinder, spring means disposed within said cylinder and normally biasing said piston at a predetermined position therein, an additional cylinder, a pair of conduit means connecting the ends of said cylinder to the ends of said additional cylinder respectively, suction head means adapted to be disposed on the outside of said aircraft and communicating with said additional cylinder, said suction head means, additional cylinder, conduit means, and apertures providing an arrangement whereby a pressure differential is applied to the opposite sides of said piston while the aircraft is moving, said piston being positioned in accordance with the magnitude of said pressure differential, indicator means operatively connected to said piston and responsive to changes in said differential, temperature responsive means, and means operatively connecting said temperature responsive means to said indicator means, said indicator means being constructed and arranged to provide an air speed measurement corrected for air temperature.

8. In air speed measuring apparatus of the character disclosed for use aboard aircraft, in combination, a cylinder having two apertures of different sizes in the two ends thereof respectively, a piston disposed within said cylinder, spring means disposed within said cylinder and normally biasing said piston at a predetermined position therein, an additional cylinder, a pair of conduit means connecting the ends of said cylinder to the ends of said additional cylinder respectively, suction head means adapted to be disposed on the outside of said aircraft and communicating with said additional cylinder, said suction head means, additional cylinder, conduit means, and apertures providing an arrangement whereby a pressure differential is applied to the opposite sides of said piston while the aircraft is moving, said piston being positioned in accordance with the magnitude of said pressure differential, an arm attached to said piston, an indicating device including a rotatable dial having a scale and a rotatable arm, means connecting said arm and rotatable arm whereby said rotatable arm moves with respect to said dial as said piston moves in response to changes in the magnitude of said pressure differential, temperature responsive means, and means operatively connecting said temperature responsive means to said dial whereby said dial and scale are rotated with respect to said rotatable arm in response to temperature changes.

9. In air speed measuring apparatus of the character disclosed for use aboard aircraft, in combination, a cylinder having two apertures of different sizes in the two ends thereof respectively, a piston disposed within said cylinder, spring means disposed within said cylinder and normally biasing said piston at a predetermined position therein, an additional cylinder, a pair of conduit means connecting the ends of said cylinder to the ends of said additional cylinder respectively, said additional cylinder having a triangular shaped aperture in the side wall thereof, an open sleeve disposed within said additional cylinder and adapted when moved along the longitudinal axis of said additional cylinder to close a varying portion of said triangular aperture, a push rod connected to said sleeve, pressure responsive means operatively connected to said push rod for adjusting the size of said triangular aperture in accordance with changes in air pressure with altitude, suction head means adapted to be disposed on the outside of said aircraft and communicating with said additional cylinder, said suction head means, additional cylinder, conduit means, and apertures providing an arrangement whereby a pressure differential is applied to the opposite sides of said piston while the aircraft is moving, said piston being positioned in accordance with said pressure differential, indicator means operatively connected to said piston and responsive to changes in said differential, temperature responsive means, and means operatively connecting said temperature responsive means to said indicator means, said indicator means being constructed and arranged to provide an air speed measurement corrected for air temperature.

10. In air speed measuring apparatus of the character disclosed for use aboard aircraft, in combination, a cylinder having two apertures of different sizes in the two ends thereof respectively, a piston disposed within said cylinder, spring means disposed within said cylinder and normally biasing said piston at a predetermined position therein, an additional cylinder, a pair of conduit means connecting the ends of said cylinder to the ends of said additional cylinder respectively, said additional cylinder having a triangular shaped aperture in the side wall thereof, an open sleeve disposed within said additional cylinder and adapted when moved along the longitudinal axis of said additional cylinder to close a varying portion of said triangular aperture, a push rod connected to said sleeve, pressure responsive means operatively connected to said push rod for adjusting the size of said triangular aperture in accordance with changes in air pressure with altitude, suction head means adapted to be disposed on the outside of said aircraft and communicating with said additional cylinder, said suction head means, additional cylinder, conduit means, and apertures providing an arrangement whereby a pressure differential is applied to the opposite sides of said piston while the aircraft is moving, said piston being positioned in accordance with said pressure differential, an arm attached to said piston, an indicating device including a rotatable dial having a scale and a rotatable arm, means connecting said arm and rotatable arm whereby said rotatable arm moves with respect to said dial as the piston moves in response to changes in the magnitude of said pressure differential, temperature responsive means, and means operatively connecting said temperature responsive means to said dial whereby said dial and scale are rotated with respect to said rotatable arm in response to temperature changes.

SAM L. LEACH.

References Cited in the file of this patent

UNITED STATES PATENTS

| Number | Name | Date |
|---|---|---|
| 462,837 | Davis | Nov. 10, 1891 |
| 1,594,808 | Anderson | Aug. 3, 1926 |
| 2,177,244 | Ciamberlini | Oct. 24, 1939 |
| 2,251,498 | Schwien | Aug. 5, 1941 |
| 2,295,728 | Gess | Sept. 15, 1942 |
| 2,361,723 | Wallace | Oct. 31, 1944 |
| 2,372,166 | McCarthy | Mar. 20, 1945 |